US008475169B2

(12) United States Patent
Wang (10) Patent No.: US 8,475,169 B2
(45) Date of Patent: Jul. 2, 2013

(54) TEACHING APPARATUS FOR ENTERPRISE INPUT-OUTPUT

(75) Inventor: Guoqiang Wang, Shenzhen (CN)

(73) Assignee: Xiying Wang, Shenzhen (CN)

( * ) Notice: Subject to any disclaimer, the term of this patent is extended or adjusted under 35 U.S.C. 154(b) by 271 days.

(21) Appl. No.: 13/032,411

(22) Filed: Feb. 22, 2011

(65) Prior Publication Data

US 2011/0207092 A1  Aug. 25, 2011

Related U.S. Application Data

(63) Continuation-in-part of application No. 11/572,859, filed as application No. PCT/CN2005/001015 on Jul. 11, 2005, now abandoned.

(30) Foreign Application Priority Data

Jul. 30, 2004  (CN) .......................... 2004 1 0050897

(51) Int. Cl.
*G09B 19/18* (2006.01)

(52) U.S. Cl.
USPC ........... 434/107; 434/108; 434/109; 434/110; 434/236; 434/237; 705/1.1; 705/7.11; 705/7.12; 705/7.13; 705/7.15; 705/7.17; 705/7.22; 705/7.23; 705/7.29; 705/7.36; 705/7.37; 705/7.38; 705/42

(58) Field of Classification Search
USPC ............. 434/107–110, 236–237; 705/1, 7.11, 705/7.12, 7.13, 7.22, 7.23, 7.36, 7.38, 1.1, 705/7.15, 7.17, 7.29, 7.37, 42
See application file for complete search history.

(56) References Cited

U.S. PATENT DOCUMENTS

| D345,699 | S | * | 4/1994 | Yang ............................. D10/21 |
| 5,369,511 | A | * | 11/1994 | Amos ............................. 359/15 |
| 6,092,050 | A | * | 7/2000 | Lungren et al. ............. 705/36 R |
| 6,767,210 | B2 | * | 7/2004 | Joffe ............................. 434/107 |
| 6,832,452 | B1 | | 12/2004 | Simens |
| 7,461,125 | B2 | * | 12/2008 | Wang et al. ................... 709/204 |
| 7,729,933 | B2 | * | 6/2010 | Ye et al. ....................... 705/7.11 |
| 2001/0027455 | A1 | * | 10/2001 | Abulleil et al. ............... 707/102 |
| 2002/0164561 | A1 | * | 11/2002 | Joffe ............................. 434/107 |
| 2004/0260588 | A1 | * | 12/2004 | Bowen ............................ 705/7 |
| 2004/0267601 | A1 | * | 12/2004 | Angley .......................... 705/10 |

(Continued)

FOREIGN PATENT DOCUMENTS

| AU | 2004202877 | 7/2004 |
| CN | 1468128 | 1/2004 |
| WO | 02/28497 | 4/2002 |
| WO | 03/086559 | 10/2003 |

*Primary Examiner* — Jack Yip
(74) *Attorney, Agent, or Firm* — Hamre, Schumann, Mueller & Larson, P.C.

(57) ABSTRACT

A teaching apparatus for enterprise input-output includes a base, said base defining a market system; a first block body defining a management module; a plurality of bands defining a production system and a product development system module, and a business system module, each band being sandwiched between two adjacent cuboids of the first block body; a vertical column defining a planning system module; a second block body defining a strategy module; a reverse quadrangle cone defining an information processing module; a cuboid vertical column disposed at a top of the reverse quadrangle cone; and a core solid column defining an internal information system, the core solid column penetrating through a center of the first block body, the bands, the vertical column, the second block body, the reverse quadrangle cone, and the cuboid vertical column.

10 Claims, 5 Drawing Sheets

U.S. PATENT DOCUMENTS

| | | | |
|---|---|---|---|
| 2005/0049904 A1* | 3/2005 | Von Biedermann | 705/7 |
| 2005/0086303 A1* | 4/2005 | Ye et al. | 709/205 |
| 2006/0277156 A1* | 12/2006 | Merican | 707/2 |
| 2006/0282380 A1* | 12/2006 | Birney et al. | 705/42 |
| 2007/0073576 A1* | 3/2007 | Connors et al. | 705/10 |
| 2007/0254267 A1* | 11/2007 | Wang | 434/107 |
| 2008/0270314 A1* | 10/2008 | Birney et al. | 705/80 |
| 2009/0083108 A1* | 3/2009 | Ye et al. | 705/8 |
| 2009/0089254 A1* | 4/2009 | Von Kaenel et al. | 707/3 |
| 2009/0191525 A1* | 7/2009 | Shepherd | 434/236 |

* cited by examiner

TEACHING APPARATUS FOR ENTERPRISE INPUT-OUTPUT

RELATED APPLICATION

This application is a continuation-in-part application of U.S. Utility patent application Ser. No. 11/572,859, which is hereby incorporated by reference in its entirety. This application claims priority to Chinese Patent No. 200410050897.5, which is hereby incorporated by reference in its entirety.

BACKGROUND OF THE INVENTION

1. Field of the Invention

The present invention generally relates to teaching apparatuses and more particularly to a teaching apparatus which is an approximate cone in structure for controlling enterprise input-output process.

2. Background of the Invention

In the past knowledge system, there is no one discipline to research all the reasons influencing enterprise input-output process. For example, enterprise management discipline only research an internal management of enterprises, which can interpret the law which enterprise management influences enterprise input-output process, but can not reveal the enterprise own variation law of the enterprise input-output process; marketing only research product sales, it can interpret the law of marketing impacting on the input-output process, but can not reveal the enterprise own variation law of the enterprise input-output process. In addition, such as material procurement, logistics, accounting, human resources, production, product development, planning, strategies, information, and so on, these disciplines only research one aspect relevant to enterprise input-output process, but can not reveal the enterprise own variation law of the enterprise input-output process. Therefore, these theories and disciplines are independent each another. Although these disciplines play a huge role in promoting development of enterprises, however, as the business competition is dramatically increased, it is increasingly important to control the enterprise input-output process. When enterprise leaders stand the height of controlling the enterprise input-output process, they will find that none of the traditional disciplines can be used to guide the enterprise input-output process. A common case is that some leaders use management to guide the enterprise input-output process, the result shows management is always successful in the enterprise, yet technology, marketing, and other aspects are lost in the enterprise. Some leaders use marketing to guide the enterprise input-output process, the result shows marketing is always successful in the enterprise, yet technology, management, and other aspects are lost in the enterprise.

Conventionally, the enterprise management, marketing, purchase, finance, human resource, production, product development, plan, strategy and information are the theories and subjects independent from each other, the textbooks for them are the training books for the enterprise's leaders. During the one-century training method development, these teaching materials play a great pushing role in the enterprise development. However, with the development of the enterprise, the weaknesses of the traditional training materials appear, which main include the weak or restrictions in 8 aspects:

1. The traditional materials focus on various component elements inside the enterprise during the research on the enterprise, which include management, marketing, purchase, finance, human resource, production, product development, plan, strategy and information. All these researches are scattered, even isolated from the enterprise operation. Most of disclosed rules are the internal development rules inside the subject and disclose the comprehensive mutual relation among various elements. For the matrix, the relation number is 9×9=81, so it can not disclose the objective rule of the whole enterprise operation. Therefore, in the past, for most of introduction materials to the enterprise, the core content is to manage the whole of the enterprise, or use the marketing or strategy to generalize the whole enterprise operation, its bug is that the local concept is used to replace the whole concept and deviate from practical operation and practical operation of the enterprise. The description to the enterprise in these textbooks involves the convents from concept to concept, from reasoning to reasoning, from abstraction to abstraction, so the enterprise leaders who lead the enterprise for the whole life can not understand the operation rule of the enterprise.

2. The past textbooks can not disclose the basic rule for the enterprise operation and can not abstract the basic ideas which guide the enterprise operation (for enterprise operation). The ideas for the enterprise operation in the past textbooks only attempt to use an enterprise operation element to dominate other elements, further dominate the whole enterprise, so it leads to man-made "weakness" of the manufacturing enterprise.

3. The traditional textbooks focus on the internal research on the operation elements of the enterprise, so it is lack of the researches on the affiliation relation among various elements for the enterprise operation and can not distinguish the affiliation relation among various elements, although they can know what the enterprises should do, but they can not know the action sequence and restriction relation among various elements.

4. The textbook only focuses on the importance of the content in the books, offer the "instruction" for the leaders which requirement the enterprise to implement, and does not describe those work which are also important during the operation process of the enterprise and are required to implement. Therefore, when the enterprise leaders focus on the main attention to an element, possible other elements are "lack" of attention during the enterprise operation, because the "instructions" offered by the traditional textbook are the detailed "instructions" for the enterprise operation and are not a general "instructions".

5. The textbook only describes how the enterprises do and does not discuss possible problems and operation level during the operation, so it makes the enterprise leaders lack of the judgement standards during the operation, so leaders are difficult to find the "weak" during the operation.

6. The past textbooks describes the enterprise operation from the angle of the enterprise management, enterprise operation and strategic decision, position the enterprise leaders at the enterprise managers, enterprise operators and strategic deciders. This method uses the detailed work to position the general work of the enterprise board chairman and general managers and leads to misguidance to the work of the enterprise's board chairman and general manager.

7. Although the past text books have a huge system and include various schools, they can not establish the complete theoretical system for the enterprise operation from the point of the enterprise operation. In the past enterprise's training teaching materials, there are no training materials which can dominate the whole enterprise, are from the ten elements inside the enterprise and are higher than the ten elements inside the enterprise. The traditional materials can not guide the whole enterprise operation.

8. The contribution of the traditional textbook to the enterprise is to direct the enterprise how to do and give no detailed steps.

SUMMARY OF THE INVENTION

The present invention generally provides a teaching apparatus for enterprise input-output to overcome the restriction of the current technology, non-operability and abstraction, which proposes an intuitive and comprehensive teaching apparatus for the enterprise input-output which has successfully guide the operation and management of the enterprise.

One embodiment of the present invention provides a teaching apparatus for enterprise input-output, including: a base, said base defining a market system; a first block body defining a management module, and the first block body including four overlapping cuboids, where the four cuboids of the first block body become smaller from a bottom to a top of the first block body in a center of the base; a plurality of bands defining a production system and a product development system module, and a business system module, each band being sandwiched between two adjacent cuboids of the first block body; a vertical column defining a planning system module, the vertical column being disposed on the first block body and the bands; a second block body defining a strategy module, the second block body including four overlapping cuboids which become larger from a bottom to a top of the second block body, wherein the second block body is disposed on a top end of the vertical column and is positioned in an opposite direction with respect to the first block body; a reverse quadrangle cone defining an information processing module, the reverse quadrangle cone being displaced on a center of a top of the second block body; four ribbons defining an enterprise outer market information feedback system, the four ribbons respectively connecting the reverse quadrangle cone with the base; a cuboid vertical column disposed at a top of the reverse quadrangle cone, the cuboid vertical column defining an information assessing and information disclosure system; and a core solid column defining an internal information system, one end of the core solid column being disposed on the base, the other end of the core solid column being disposed on the cuboid vertical column, and the core solid column penetrating through a center of the first block body, the bands, the vertical column, the second block body, the reverse quadrangle cone, and the cuboid vertical column.

Further, a concave is defined in the center of the base, four ring steps being formed on an inside wall of the concave.

Further, the base is divided into four equal areas, respectively defining a product sale module, a capital operation module, a material and technology purchase module, and a human resource module, the product sale module including four ring steps defining a low-value sale level, a market value sale level, a high-value sale level and an ultra-value sale level from a bottom to a top of the concave; the capital operation market module including four ring steps defining a capital reduction level, a capital market value level, a capital high value level and a capital ultra-value level; the material and technology purchase module including four ring steps defining a high-price purchase level, a market value purchase level, a low-price purchase level and a personalized purchase level; the human resource module including four ring steps defining a high-price employment level, a market price employment level, an economic employment level and an ultra-value level; a vertical height of each step of the capital operation module, the material and technology purchase module, the human resource module from the bottom to the top of the concave representing a price level obstacle, a relation level obstacle, a brand level obstacle and an information level obstacle, a vertical height of each step of the product sale module representing a price level obstacle, an information level obstacle, a brand obstacle and a relation level obstacle from the bottom to the top of the concave, the area defining the product sale module being symmetric to the area defining the material and technology purchase module, the area defining the capital operation module being symmetric to the area defining the human resource module.

Further, each of the first block body, the ring steps and the bands includes at least four levels, the number of bands is eight and the bands being configured to form "+" shape, one end of each band connected to a corresponding ring step.

Further, the four overlapping cuboids of the first block body respectively representing an invalid management module, a valid management module, a high-efficiency management module and an innovative management module from the bottom to the top of the first block body; the bands including an invalid level, a valid level, a high-efficiency level and an innovative level from a bottom to a top of the bands corresponding to each module of the first block body.

Further, one end of the bands respectively connects with the product sale module, the capital operation module, the material and technology purchase module and the human resource module to thereby respectively defining the eight bands as a marketing system module, a financial system module, a purchase system module, and a human resource system module, a crossing center of the bands forming the production system and product development system module.

Further, the vertical column is divided into three sections from a bottom to a top of the vertical column, representing a middle and long term plan, an annual plan and a monthly plan, respectively, four sides of the vertical column representing a market marketing plan corresponding to the product sale module, a capital operation plan corresponding to the capital operation module, a material and technology purchase plan corresponding to the material and technology purchase module, and a human resource plan corresponding to the human resource module.

Further, the four overlapping cuboids of the second block body respectively representing a non-information strategy module, a semi-information strategy module, a current information strategy module and a full-information strategy module from the bottom to the top of the second block body; the top surface of the second block body representing said strategy module, the strategy module including a core strategy, an edge strategy, a profiting mode strategy, a management elevation strategy, a product development strategy, a market area strategy and an enterprise scale strategy; the edge strategy including a market sale strategy, a capital operation strategy, a material and technology purchase strategy and a human resource strategy, which are located around the core strategy, wherein said market sale strategy corresponds to the product sale market module on the top and bottom of same side, the capital operation strategy corresponds to the capital operation market on the top and bottom of same side, the material and technology purchase strategy corresponds to the material and technology purchase market module on the top and bottom of same side, the human resource strategy corresponds to the human resource market module on the top and bottom of same side.

Further, four sides of the reverse quadrangle cone respectively represents a sale information processing, a fund information processing, a material and technology processing and a talent information processing of the market system; four ribbons respectively connecting the cone with the base representing that the information directly get market information from the market system module, a top surface of the reverse quadrangle cone representing an information center, four ribbons respectively connecting the cone with the cuboid vertical column representing that the inner information of the enterprise directly transmits to the information center, the four sides of the cuboid vertical column respectively represents the enterprise's product competition, capital competition, material and technology purchase competition and human competition, the peak of the cuboid vertical column represents the enterprise's core competition.

Further, the teaching apparatus for enterprise input-output shows an approximate pyramid shape on the whole, along the direction form a bottom to a top of the teaching apparatus, each cuboid of the first block body is overlapped to form a pyramid in shape, each cuboid of the second block body is overlapped to form a reverse pyramid in shape; each cuboid of the first block body and the second block body is a quadrangle or cylinder shaped desk, the vertical column is rectangular in shape, and the core solid column is a cylinder in shape.

Based on the eleven elements for influencing the enterprise input-output (market, management, sale, purchase, finance, human resource, production, product development, plan, strategy and information), the beneficial effects of this invention are as follows: use solid and visual apparatus to give the intuitive array and solid combination maximizing the value, disclose the necessary relation among elements such as mutual action and restriction, as well as the different levels and causality for the enterprise operation, so the apparatus visually demonstrates the basic rule of the enterprise operation. This apparatus is used as the teaching tool for the enterprise input-output, enables the enterprise leaders to view the enterprise independently, visually appreciates the rule of the enterprise operation, abstracts the enterprise idea through the solid apparatus and can be used as a tool for the enterprise input-output to improve the capability for the enterprise operation.

In addition, in the teaching apparatus for enterprise input-output in accordance with the present invention, the enterprise input-output process is divided into three processes, namely the primary process, auxiliary process and guidance and control processes. The structure of the teaching apparatus shows: as long as enterprise leaders manage the guidance and control processes well, the leaders will be able to preferably control the primary process and the auxiliary process in the enterprise input-output process. From another point of view, as long as the enterprise leaders use guidance and control technology well, production and management of enterprises will be preferably organized.

The construction and method of operation of the invention, however, together with additional objects and advantages thereof will be best understood from the following description of specific embodiments when read in connection with the accompanying drawings.

DETAILED DESCRIPTION

Referring to FIGS. 1-6, a teaching apparatus for enterprise input-output 100 in accordance with the present invention shows an approximate pyramid shape with the symmetric four edges. The teaching apparatus for enterprise input-output 100 is made of plastic, metal, wood or other material. The teaching apparatus for enterprise input-output 100 includes a base 1 defining a market system, a first block body 20 defining a management module, a plurality of bands 30 defining a production system and a product development system module, and a business system module, a vertical column 40 defining a planning system module, a second block body 50 defining a strategy module, a reverse quadrangle cone 60 defining an information processing module, and the reverse quadrangle cone 60 being displaced on a center of a top of the second block body 50; four ribbons 63 defining an enterprise outer market information feedback system, the four ribbons 63 respectively connecting the reverse quadrangle cone 60 with the base 1; a cuboid vertical column 70 disposed at a top of the reverse quadrangle cone 60, the cuboid vertical column 70 defining an information assessing and information disclosure system; and a core solid column 80 (or a vertical axis) defining an internal information system, one end of the core solid column 80 being disposed on the base 1, the other end of the core solid column 80 being disposed on the cuboid vertical column 70, and the core solid column 80 penetrating through a center of the first block body 20, the bands 30, the vertical column 40, the second block body 50, the reverse quadrangle cone 60, and the cuboid vertical column 70.

Figure 1:
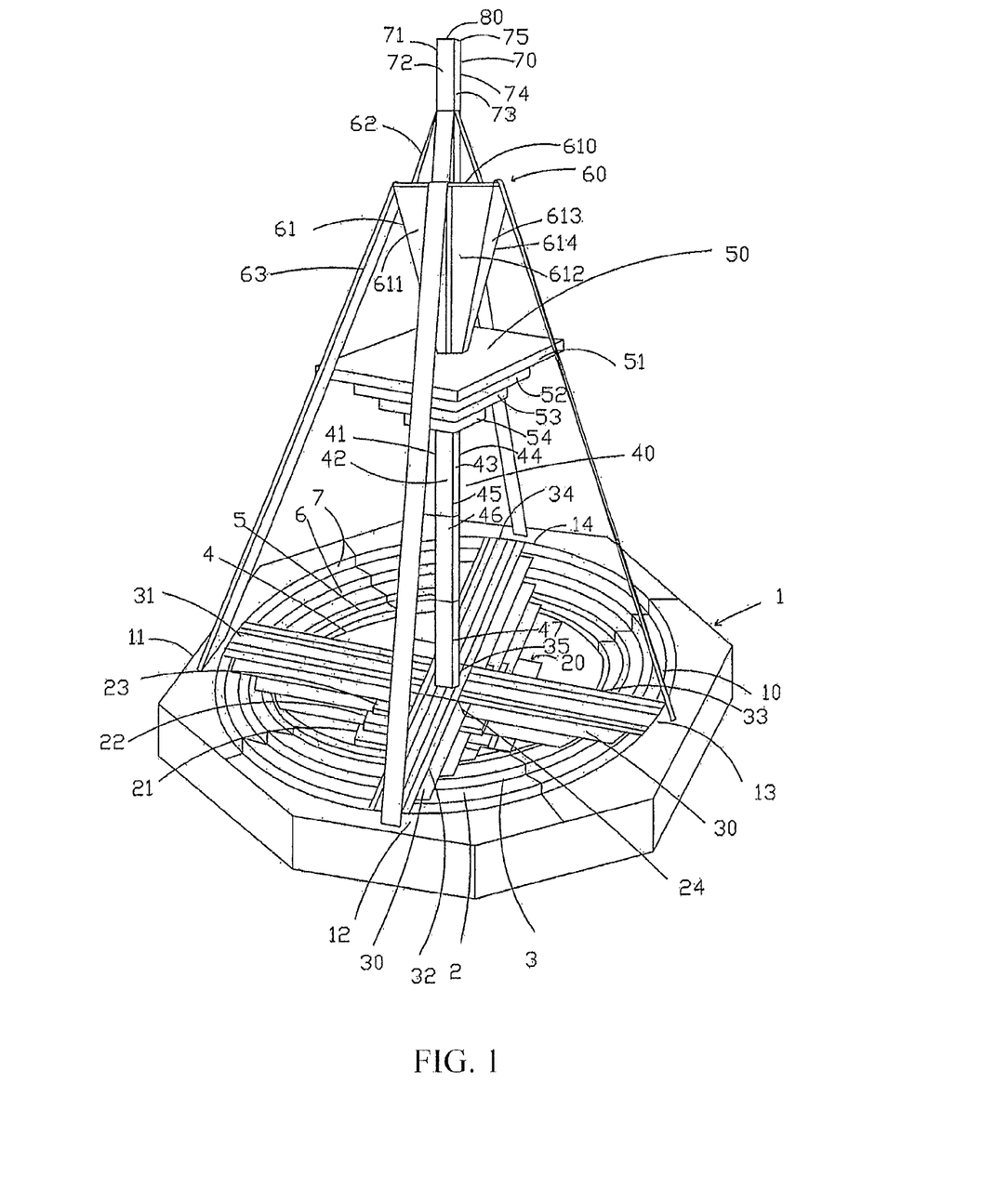
FIG. 1 illustrates a view of an exemplary teaching apparatus for enterprise input-output in accordance with the present invention.
Figure 2:
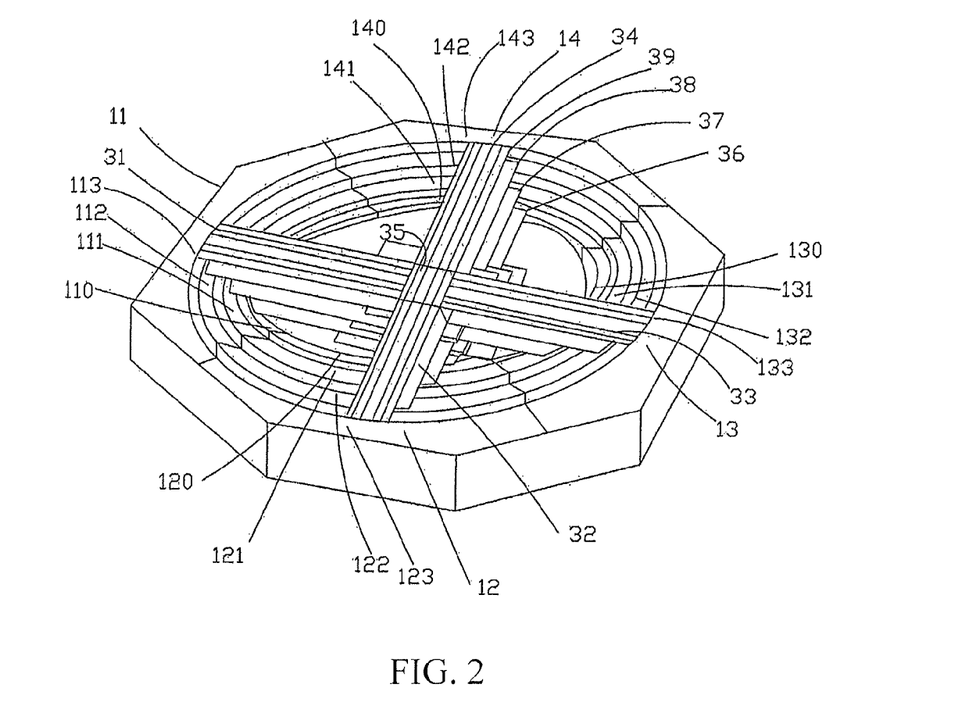
FIG. 2 is a part view of the exemplary teaching apparatus for enterprise input-output in accordance with the present invention.
Figure 3:
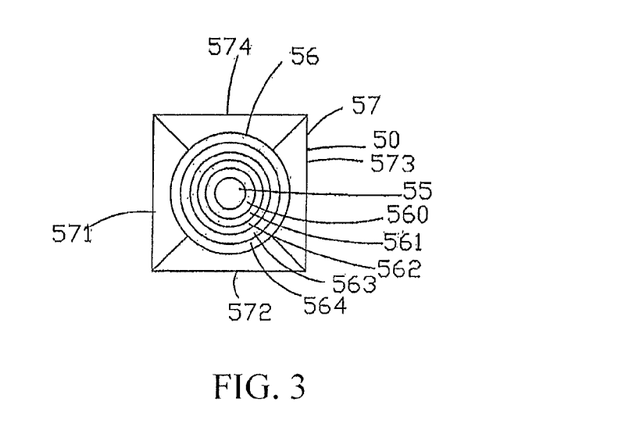
FIG. 3 is another part view of the exemplary teaching apparatus for enterprise input-output in accordance with the present invention.
Figure 5:
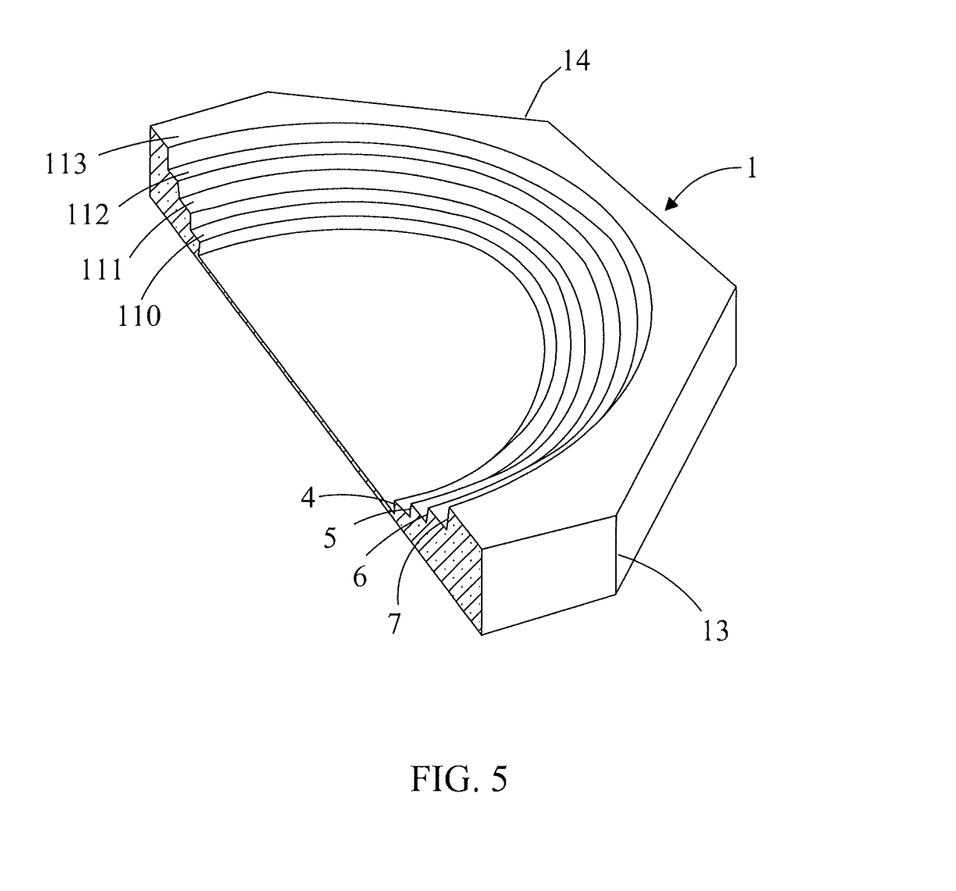
FIG. 5 is a cross-sectional view of the base of the teaching apparatus.

A market system module 10 is defined by the periphery of the base 1, as shown in FIG. 1, FIG. 2, and FIG. 5. The market system module 10 is divided into a product sale module 11, a capital operation module 12, a material and technology purchase module 13 and a human resource module 14. In this preferred embodiment, the base 1 is a column with an octagonal section, understandably, the base 1 may be a cylinder or other shape. The product sale module 11, the capital operation module 12, the material and technology purchase module 13, and the human resource module 14 are respectively distributed on each edge of the octagonal column, they are separated by the edge between them, and their centers are symmetric to each other, namely the center of the product sale module 11 is symmetric to the center of the material and technology purchase module 13, the center of the capital operation module 12 is symmetric to the center of the human resource module 14. In order to conveniently distinguish them, in the embodiment, the product sale module 11, the capital operation module 12, the material and technology purchase module 13, and the human resource module 14 may be colored different colors, such as yellow, blue, white, and red, respectively. Correspondingly, the part toward the product sale module 11, the capital operation module 12, the material and technology purchase module 13, and the human resource module 14, of the first block body 20, the vertical column 40, the second block body 50, the reverse quadrangle cone 60, the four ribbons 63, 62, and the cuboid vertical column 70 may be respectively colored different colors, such as yellow, blue, white, and red.

A concave 2 is formed on the center of the base 1. A ring step 3 is formed in an inside wall of the concave 2. The ring step 3 is divided into four layers, from the bottom of the concave 2 to top. The ring step 3 divides the product sale market module 11 as a low-value market level 110, a market value sale level 111, a high-value sale level 112 and an ultra-value sale level 113, as shown in FIG. 5. The ring step 3 also divides the capital operation module 12 into a capital value-decrease level 120, a capital market value level 121, a capital high-value level 122, a capital ultra-value level 132, and a personalized purchase level 133. Furthermore, the ring step 3 divides the human resource module 14 into a high-value employment level 140, a market value employment level 141, an economic employment 142 and an ultra-value employment level 143. From the bottom to the top of the concave 2, for the capital operation market module 12, the material and technology purchase module 13 and the human resource module 14, the vertical height of various steps represent a price level block 4 (or price level obstacle), a relation level block 5 (or relation level obstacle), a brand level block 6 (or brand level obstacle) and an information level block 7 (or information level obstacle) in turn. For the product sale market module 11, the vertical height of the step represents the price level block 4, the information level block 5, the relation block 6 and the brand level block 7 in turn. All these blocks (or obstacles) are obstacles for the enterprise operation, if the enterprise operation spans a block, it will ascend to a new step.

The level 110-113, 120-123, 130-133 and 140-143 of the four modules 11-14 of the market system module 10 corresponds to the described block 4-7 level in the horizontal direction, so based on the stage of the market system during the enterprise operation, you can find the block reasons for the development form the apparatus in this invention intuitively. The market is seen as the external element and external conditions for the enterprise operation, it is seen as the external environment of the base 1 of the sold module 100 and enterprise elements to represent the market objectively, it is not determined by the enterprise's will, the enterprise operation must conform to the market operation rules.

Figure 4:
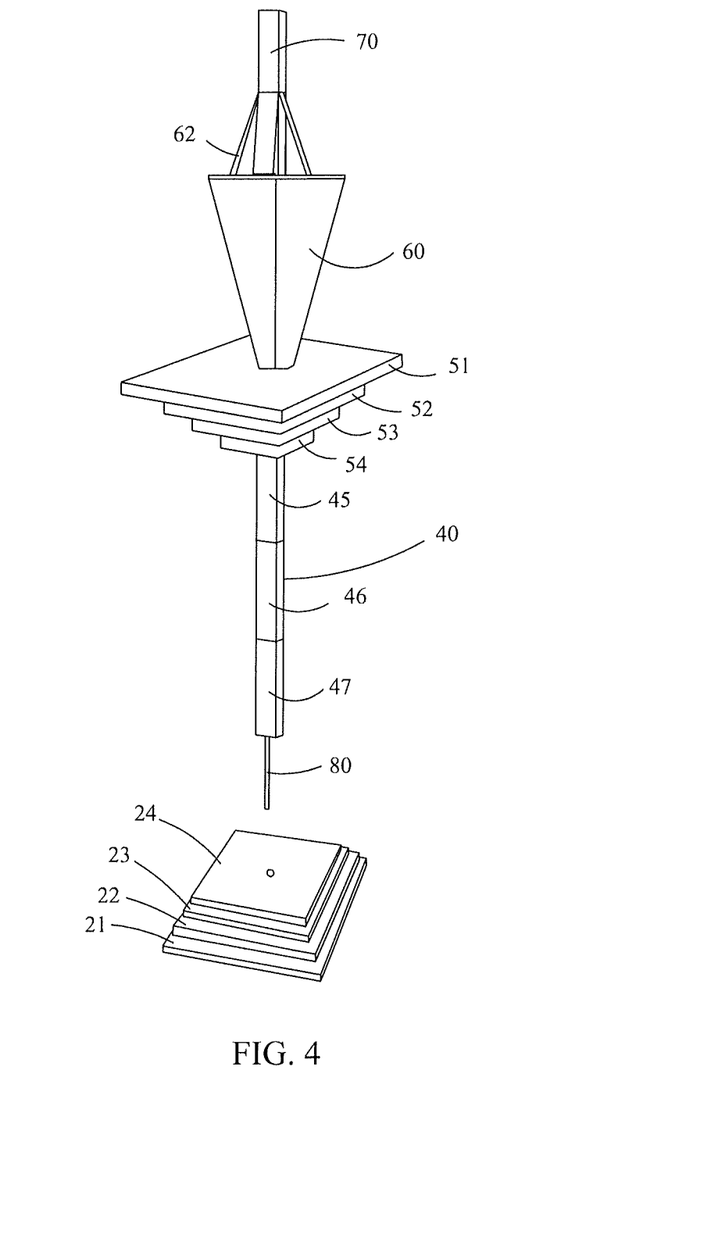
FIG. 4 is a partially exploded view of the exemplary teaching apparatus for enterprise input-output in accordance with the present invention.
Figure 6:
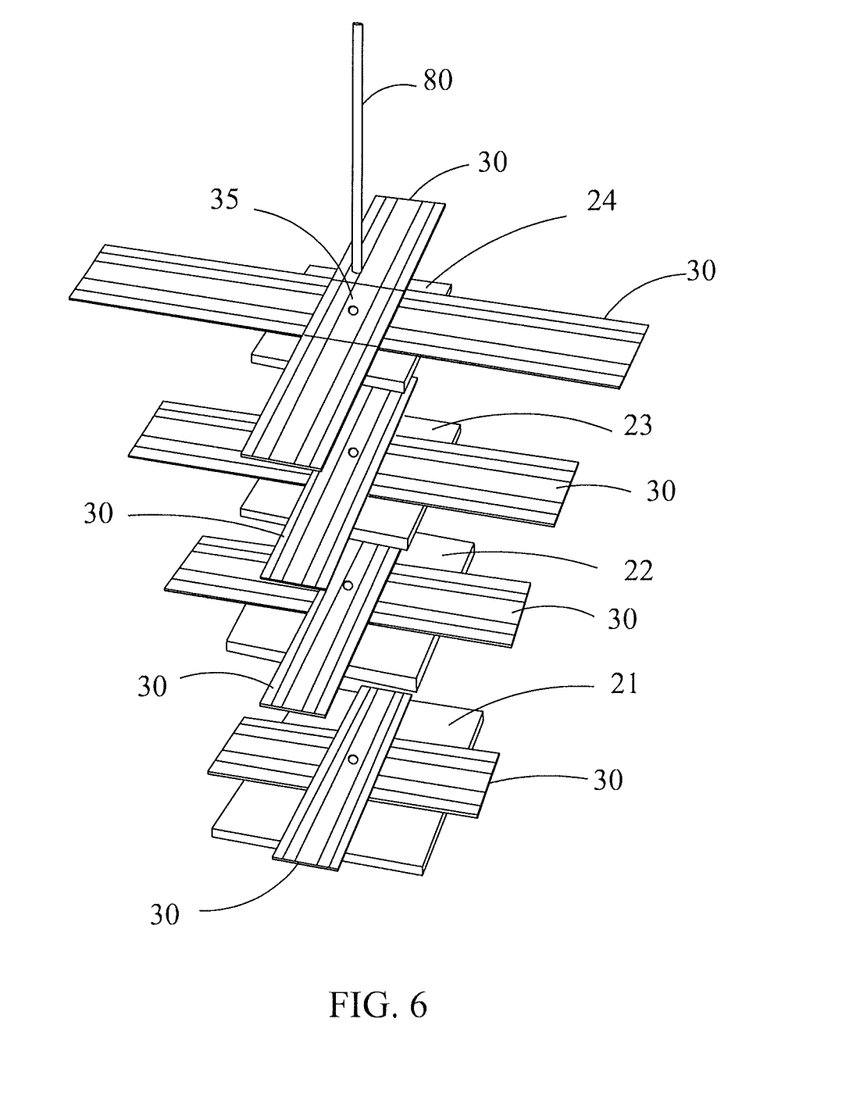
FIG. 6 is another partially exploded view of the exemplary teaching apparatus for enterprise input-output in accordance with the present invention.

Referring to FIG. 1, FIG. 4, and FIG. 6, the first block body 20 defining management module is formed through overlapping of the cuboids which gradually become smaller from the bottom center of the concave 2 of the base 1 upward. The first block body 20 is divided into four levels, which are an invalid manage module 21, a valid management module 22, a high-efficiency management 23 and an innovative management module 24 from the center of the base 1 to top, all levels of the first block body 20 respectively correspond to the ring step 3 in the concave 2 of the above-mentioned base 1, which indicates that the management level corresponds to the level of the market system. In this embodiment, the height of component modules of the first block body 20 is same to the step 3. The above-mentioned first block body 20 is under the bottom of the bands 30 and the production system and product development system module 35, which indicates that the management is the foundation of the business and production, the management level determines the business level and production level. Each level of the management module 21-24 respectively sets two bands 30 with "+" marks, it represents the business and production system for an enterprise.

The above bands 30 include eight bands, each level of the four levels has two bands to form the "+" shape, as shown in FIG. 6, ends of the bands 30 is combined with the product sale module 11, the capital operation module 12, the material and technology purchase module 13, human resource module 14 to form the four areas: an marketing system module 31, an financial system module 32, an purchase system module 33, and an human resource system module 34. The crossing center of the described four areas forms the described production system and product development system module 35, these five areas are selected by the enterprise to establish the profiting mode, including strengths of each area (including market strengths, resource strengths and capability strengths), which area is dominated, so the enterprise can cultivate the core competition and establish the profiting mode of the enterprise.

The described area 31-35 corresponds to the first block body 20 defining management module and respectively represents the four levels with the different business levels: an invalid business level 36 for invalid management, a valid business level 37, a high-efficiency business level 38 and an innovative business level 39, one end of the described levels is connected to the four-level step of the four market module 11-14, it shows that the four market steps are the results of the four business levels. Another end of the up and down four level of this banded module is connected the four-level production system and product development system module 35 at the center of the mark "+". Its bottom is connected with the first block body 20 and its top is connected to the vertical column 40 defining a planning system module, it indicates that the business level is directly associated with the market block, and with the production, development, management and planning level. The level 36-39 of the described bands 30, the level 21-24 of the first block body 20 and four modes of the market system module 10 correspond to the level 110-113/120-123/130-133/140-143 of the module 11-14 in the horizontal direction.

Each ribbon portion of the band 30 and the production system and product development system module 35 includes five different color ribbons portion, which represent that each band 30 and production system and product development system consist of five elements. Five different ribbons portion represent five different elements, it includes two purposes:

1. It represents the work of each module, the obtained enterprise supporting items should not exceed the five listed items, these five supported items are from the following supported directions in the invention teaching apparatus: the back, left and right (person, finance and material), bottom (management) and top (planning).
2. Second purpose is to facilitate the diagnosis for the enterprise operation. Once one module of the sale, production (development), purchase, finance and human resource can not fulfill the planned index, this module should be checked whether to encounter a problem. Because this module includes five elements, the most intuitive and simple diagnosis method is the elimination method, first those normal elements are eliminated, the problem element can be found. Once the problem element is found, the reason should be diagnosed. The most intuitive and simple method is the tracing method, you can track back the reason in accordance with the same color, the direct reasons include back, left and right party (person, finance and material), bottom (management) and top (plan) reason, for the indirect reason, you can trace back to the strategy and information.

The vertical column 40 defining the planning system module shows the vertical column shape, on the four sides, the corresponding side of the product sale module 11 is the market sale plan 41; the corresponding side of the capital operation module 12 is the capital operation plan 42; the corresponding side of the material and technology purchase module 13 is the material and technology purchase plan 43; the corresponding side of the human resource module 14 is the human resource plan 44. The vertical column 40 is at the top of the bands 30, production system and product development system module 35 and the first block body 20 and represents the work scheme of the enterprise management, marketing, purchase, finance, human resource, production and product development, they are guided and restricted by the plan. The bottom of the vertical column 40 is connected with the production system and product development system module 35, the top is connected with the second block body 50, and the vertical column 40 is divided into a middle and long term planning module 45, an annual planning module 46 and a monthly planning module 47 in the direction from the second block body 50 to the production system and product development system module 35.

The second block body 50 defining the strategy module shows the reverse pyramid shape which is overlapped by the four cuboids gradually becoming larger from bottom to top, and is located between the reverse quadrangle cone 60 defining the information module and the vertical column 40 defining the planning system module, and from top to bottom in vertical direction of the reverse quadrangle cone 60 and the vertical column 40, it is divided into a full information strategy module 51, a current-information strategy module 52, a semi-information strategy module 53 and a non-information strategy module 54, they represent the strategy level of different layers, the module content shows that information level must be improved for improvement of strategy level. Please also refer to the FIG. 3 for details, the described second block body 50 shows the strategy system including a core strategy 56 an edge strategy 57, the core strategy includes 6 items and surround an enterprise culture (idea) strategy 55, based on the logic relation, the strategies are expanded from interior to outside in turn as follows: a profiting module strategy mode strategy 560, a management improving strategy 561, a product development strategy 562, a market area strategy 563 and an enterprise scale strategy 564; the edge strategy 57 includes four items, they are respectively located at the surrounding of the core strategy 56: the product sale market module 11 corresponds to the market sale strategy 571 on the top and bottom of the same side, the capital operation market module 12 corresponds to the capital operation strategy 573 on the top and bottom of the same side, the material and technology purchase market module 13 corresponds to the material and technology purchase strategy 573 on the top and bottom of the same side, the human resource market module 14 corresponds to the human resource strategy 574 on the top and bottom of the same side. The second block body 50 discloses three strategic roles: (1) the core strategy 56 guides the whole enterprise; (2) the edge strategy 57 guides the four operation work and orients to four markets; (3) the strategy is the foundation of the plan, the plan is converted into the strategy.

The reverse quadrangle cone 60 defining the information processing module includes a reverse quadrangle cone body 61 disposed at the top of the second block body 50, it represents the process form the rough to fine. The four sides of the cone body 61 respectively represents a sale information processing 611, a fund information processing 612, a material and technology information processing 613 and a talent information processing 614 from the four system modules 11-14. A ribbon 63 connecting the cone body 61 with the top of the four market modules 11-14 represents that the information system directly gets the information from four markets 11-14; at the center of the planning module, the core solid column 80 at the center of the cuboid vertical column 70 which penetrates the bottom of the management module 20 and top of the information cone 61 represents the information system inside the enterprise, each system inside the enterprise will feed the internal information back to an information center 610 at a top surface of the information processing module 60, a cuboid vertical column 70 at the top of the cone body 61 represents information assessing and information disclosure system of the enterprise based on the information, the four sides of the vertical column respectively represents a product competition 71 of the enterprise, a capital competition 72, a material and technology purchase competition 73 and a human competition 74 at the top of the vertical column 70, namely the peak of this teaching apparatus, represents the core competition of an enterprise (namely profiting capability) 75, it is the fundamental aim for the enterprise operation.

The peak of the cone body 61 is connected with the enterprise culture idea strategy 55 of the second block body 50 defining the strategy module and represents that only the idea of the enterprise leaders at the high level can understand the information and prepare for and adjust the strategy according to the information.

The "+" horizontal line in the teaching apparatus 100, namely the bands connecting the material and technology purchase market 13 with product sale market 11, is the main flow for the enterprise operation—supply, production and sale flow. The described "+" vertical line, namely the bands connecting the capital operation market 12 with the human resource market 14, is the auxiliary flow for the enterprise operation—finance flow and human resource flow. The management flow at the bottom of the "+" center is the fundamental flow of the main and auxiliary flow; the planning flow, strategy flow and information at the top of the "+" center is the guiding flow of the main and auxiliary flow.

When the enterprise manager uses the teaching apparatus 100 in this invention, first, the external market information is directly reflected by the four sub-system 11-14 of the market system module 10 represented by the surrounding of the base 1 and respectively input the product sale site information, capital market information, material and technology market information and human resource market information to the information center 610 of the information module 60 through four titled ribbon 63 connecting the market system module 10 with the information module 10, meanwhile, the internal information during the enterprise operation is inputted to the information center 610 of the cone body 61 through the four short tilted ribbons 62 at the top of the cone body 61 of the reverse quadrangle cone 60, next, the information is processed in accordance with the category of the four side 611-614 of the cone body 61 and is inputted to the enterprise culture idea strategy 55 of the second block body 50 center from the peak of the reverse cone body 61, through the enterprise culture idea, on the one hand, the center strategy 56 and edge strategy 57 of the enterprise is prepared based on the inputted market information, the plan is prepared based on the enterprise's strategy, it shows in the teaching apparatus 100 of the invention that the overlapped reverse pyramid second block body 50 is vertically connected with the vertical column 40 downward; the prepared plan fist is middle and long term plan (represented by the middle and long term planning module 45), second plan is the detailed monthly plan (represented by the monthly planning module 47), the described plan includes the market sale, capital operation, material and technology purchase, and human resource plan, the monthly plan is inputted to the production system and product development system (represented by the production system and product development system module 35 at the center of the band 30), and then configure and use the enterprise resource and realize the operation.

During the business and management of the enterprise, the strategy level (full information strategy, current information strategy, semi-information strategy and non-information strategy), management level (innovative management, high-efficiency management, valid management, or invalid management) determine the operation situation of the enterprise (innovative operation, high-efficiency operation, valid operation and invalid operation), it is intuitively reflected from the teaching apparatus 100 of this invention. The details are as follows, the second block body 50 is divided into the full-information strategy module 51, current information strategy module 52, semi-information strategy module 53, non-information strategy 54 from the top down, the first block body 20 is divided into the innovative management module 24, high-efficiency management module 23, valid management module 22 and invalid management module 21 from top to bottom. The business system module 30 is divided into the innovative business level 39, high efficiency business level 38, valid business level 37 and invalid business level 36, you can find each level for the enterprise operation from the teaching apparatus 100 in this invention. The obstacles from the low level to high level include the price level obstacle level 4, relation level obstacle 5, brand obstacle 6 and information obstacle 7.

In use, the teaching apparatus is placed in front of students, the students are taught using the basic elements that effect an enterprise input-output process, the students are clarified by using the basic processes of the enterprise input-output process. By teaching the enterprise input-output process control technique, the ability of the students to control the enterprise input-output is improved. The specific implementation steps are described as follows:

First, the students are showed eleven elements that effect an enterprise input-output process by observing the teaching apparatus, so that the students understand eleven direct causes that effect the enterprise input-output process from the outside of the enterprise. At this point, the teaching apparatus can play a "Memorandum of Input-output" role. To achieve these goals, it will be completed through the following eleven steps.

1. The base of the teaching apparatus represents the market factors that effect the enterprise input-output process. In the base 1, the market is divided into four modules (or four markets) such as the product sale module 11, the capital operation module 12, the material and technology purchase module 13, and the human resource module 14. Through the analysis of these four modules, the students are taught that supply and demand changes and price changes will directly effect the enterprise input-output efficiency in the market. So when the business leaders control the input and output process, do not forget to analyze the four markets. In addition, the product sale module 11 is formed to have a low-value market level 110, a market value sale level 111, a high-value sale level 112 and an ultra-value sale level 113. Using the four levels, the evaluation criteria for the enterprise sale can be taught to the students. Evaluation steps are described as follows: If the enterprise sale level is located on a low-value market level 110, the sale product price does not meet the market average sale price, thus, the enterprise income and profits will be reduced; If the enterprise sale level is located on a market value sale level 111, the sale product price achieves the market average sale price, thus, the enterprise income and profits will be average; If the enterprise sale level is located on a high-value sale level 112, the sale product price exceeds the market average sale price, thus, the enterprise income and profits will be increased; If the enterprise sale level is located on an ultra-value sale level 113, the sale product price achieve the market maximum sale price, thus, the enterprise income and profits will be maximum in the industry. Through the analysis, the teaching apparatus tells the students that the four levels can be used as the evaluation criteria of the enterprise product sale to evaluate the enterprise product sale levels.

Besides the product sale module 11, the base 1 of the teaching apparatus further includes the capital operation module 12, the material and technology purchase module 13 and the human resource module 14, and the capital operation module 12, a material and technology purchase module 13 and a human resource module 14 are also formed to have four levels, respectively. As such, the four levels of the capital operation module 12 can be used as the evaluation criteria of the enterprise capital operation to evaluate the capital operation levels of the enterprise. The four levels of the material and technology purchase module 13 can be used as the evaluation criteria of the enterprise material and technology purchase to evaluate the material and technology purchase level of the enterprise. The four levels of the human resource module 14 can be used as the evaluation criteria of the enterprise human resource to evaluate the human resource levels of the enterprise. The teaching apparatus tells the students that the four levels can be used as the evaluation criteria of the enterprise sale to evaluate the enterprise sale levels. Their principles and evaluation steps and the operation steps of the evaluation sale levels are similar.

In addition, the base further four work obstacles. Through analysis of four obstacles, the students can be understood how to break the market barriers and their experience and lessons. The operating steps are described as follows: for example, in the product sale module 11, from the bottom up, the vertical height of the step represents the price level block 4, the information level block 5, the relation block 6 and the brand level block 7 in turn. All these obstacles are obstacles for the enterprise operation, if one obstacle is broken, the product sale level will ascend to a new step. For example, if an enterprise only break through the market price level obstacles through lessen the price, and the enterprise can achieve product sale, but the sale level is lowest and located on the low-value market level 110; If the enterprise can take full advantage of market information, are not fooled by others to be able to break through the information level obstacle on the sale market, the sale level can be located on the market value sale level 111; If the enterprise can break through relation barrier by a sale activity, and work with customers to establish the strategic cooperative relations, the sale level can be located on a high-value sale level 112; if the products of the enterprise is establishing a notable brand to break through the brand level obstacles in the sale market, the sale level is located on the fourth step named an ultra-value sale level 113.

In the teaching apparatus of the invention, besides product sale module has four obstacles, the capital operation module 12, the material and technology purchase module 13 and the human resource module 14 also shows four obstacles. Their principles and laws and the analysis steps of the sale market are similar.

2. In the teaching apparatus, the marketing system module 31 represents the sale activity of the enterprise. The marketing system module 31 is divided into four levels defining different levels which are the invalid business level 36, the valid business level 37, the high-efficiency business level 38 and the innovative business level 39 from the bottom up. The invalid business level 36 shows that the sale activity of the enterprise is invalid to thereby corresponding to the low-value market level 110. The valid business level 37 shows that the sale activity of the enterprise is valid to thereby corresponding to the market value level 111. The high-efficiency business level 38 shows that the sale activity of the enterprise is high-efficient to thereby corresponding to the high-value sale level 112. The innovative business level 39 shows that the sale activity of the enterprise is innovative to thereby corresponding to the ultra-value sale level 113.

3. In the teaching apparatus, the production system and product development system module 35 is divided into four levels which represent the different production levels of the enterprise which are the invalid production level, the valid production level, the high-efficiency production level and the innovative production level from the bottom up. The invalid production level shows that the production activity of the enterprise is invalid to thereby corresponding to the invalid business level 36. The valid production level shows that the production activity of the enterprise is valid to thereby corresponding to the valid business level. The high-efficiency production level shows that the production activity of the enterprise is high-efficient to thereby corresponding to the high-efficiency business level 38. The innovative production level shows that the production activity of the enterprise is innovative to thereby corresponding to the innovative business level 39. It shows that the production level of the enterprise determines the sale level of the enterprise. If the enterprise wants to improve the sale level, the production level must be fundamentally improved.

4. In the teaching apparatus, the purchase system module 33 is divided into four levels which represent the different purchase levels of the enterprise which are the invalid purchase level, the valid purchase level, the high-efficiency purchase level and the innovative purchase level from the bottom up. The invalid purchase level shows that the purchase activity of the enterprise is invalid to thereby cause the invalid production. The valid purchase level shows that the purchase activity of the enterprise is valid to thereby support the valid production. The high-efficiency purchase level shows that the purchase activity of the enterprise is high-efficient to thereby support the high-efficiency production. The innovative purchase level shows that the purchase activity of the enterprise is innovative to thereby support the innovative production. It shows that the purchase level of the enterprise determines the production level of the enterprise. If the enterprise wants to improve the production level, the purchase level must be fundamentally improved.

5. In the teaching apparatus, the financial system module 32 is divided into four levels which represent the different financial levels of the enterprise which are the invalid financial level, the valid financial level, the high-efficiency financial level and the innovative financial level from the bottom up. The invalid financial level shows that the financial activity of the enterprise is invalid to thereby cause the invalid purchase, the invalid production and the invalid sale. The rest may be deduced by analogy. It shows that the financial level of the enterprise influences the purchase level, the production level and the sale level of the enterprise. If the enterprise wants to improve the purchase level, the production level and the sale level, the financial level must be fundamentally improved.

6. In the teaching apparatus, the human resource system module 34 is divided into four levels which represent the different human resource levels of the enterprise which are the invalid human resource level, the valid human resource level, the high-efficiency human resource level and the innovative human resource level from the bottom up. The invalid human resource level shows that the human resource activity of the enterprise is invalid to thereby cause the invalid purchase, the invalid production and the invalid sale, because the invalid human resource can not provide proper workers for these departments. The rest may be deduced by analogy. It shows that the human resource level of the enterprise influences the purchase level, the production level and the sale level of the enterprise. If the enterprise wants to improve the purchase level, the production level and the sale level, the human resource level must be fundamentally improved.

7. In the teaching apparatus, the production system and product development system module 35 (the production system module and the product development system module are incorporated as a whole) is divided into four levels which represent the different product development levels of the enterprise which are the invalid product development level, the valid product development level, the high-efficiency product development level and the innovative product development level from the bottom up. The invalid product development level shows that the product development activity of the enterprise is invalid to thereby not provide the new product, new technology for the enterprise. Thus, it causes the future production and sale of the enterprise invalid. The rest may be deduced by analogy. Here, it shows that the product development level of the enterprise effects the future production and sale levels of the enterprise. If the enterprise wants to improve the production and sale levels, the product development level must be fundamentally improved.

8. In the teaching apparatus, the first block body 20 defining management module is divided into four levels which represents an invalid manage module 21, a valid management module 22, a high-efficiency management 23 and an innovative management module 24 from the center of the base 1 to top. The invalid manage module 21 shows rules and regulations used to manage the production and business activities can not be a behavior criterion for the production and operation of the enterprise, thus it will inevitably lead to the invalid management. The rest may be deduced by analogy. It shows that the management level of the enterprise influences the production and operation level of the enterprise. If the enterprise wants to improve t the production and operation level, the management level must be fundamentally improved.

9. In the teaching apparatus, the vertical column 40 defining the planning system module is divided into three sections which are the middle and long term planning module 45, the annual planning module 46 and the monthly planning module 47 from the top down. The monthly planning module 47 is used to guide the monthly production and operation of the enterprise (including six items jobs such as sale, production, purchase, finance, personnel, product development). The annual planning module 46 is used to guide the annual production and operation of the enterprise. The middle and long term planning module 45 is used to guide the development direction of the enterprise within five years. The production and business planning is the oriented system for the enterprise, which grasp the future of the enterprise. The mistake of the planning system is the biggest mistake. It shows the planning level of the enterprise will effect the production and operation level. If an enterprise wants to raise the production and operation level, the planning level of the enterprise must also be improved.

10. In the teaching apparatus, the second block body 50 defining the strategic module is divided into fours modules which are the full information strategy module 51, the current information strategy module 52, the semi-information strategy module 53 and the non-information strategy module 54 from the top down. The non-information strategy module 54 means that the constituted strategy is not supported by the information, and can not serve as the basis for the production and operation plans. The semi-information strategy module 53 means that the constituted strategy is only supported by the half information, and can not serve as the basis for the production and operation plans. The current information strategy module 52 means that the constituted strategy uses the current information, and can not serve as the basis for the production and operation plans due to without the future five-year forecasted information. The full information strategy module 51 means that the constituted strategy are supported by the future five-year forecasted information, and can serve as the basis for the production and operation plans. It shows the strategy level will effect the planning level, further effect the production and operation level of the enterprise. If the enterprise wants to raise the future production and operation level, the strategy level must be improved.

11. In the teaching apparatus, the reverse quadrangle cone 60 defining an information processing module. Information is the fundamental basis that constitutes the plan and strategy of the enterprise. The obtained information for the enterprise includes external information and internal information. External information is provided by the four long ribbons 63 defining an enterprise external market information feedback system and the short ribbon 62 defining an enterprise internal market information feedback system. The conventional form of the information feedback system is the report forms system. Information work is important because it shows the enterprise information level will effect the strategy and planning level, thereby further effecting the production and operation level of the enterprise. If the enterprise wants to raise the future production and operation level, the information level must be improved.

Through the above analysis to eleven steps, the eleven elements of the enterprise input-output process are gradually shown. The results show that the teaching apparatus can reveal direct reasons that effect the enterprise input-output process. The students can understand that the enterprise input-output process are preferably controlled by preferably controlling all the eleven elements. Do not grasp one point, and regardless of the rest.

Second, the basic process of the enterprise input and output is interpreted to the students by use of the teaching apparatus. The teaching apparatus of the invention not only finds all the eleven elements that effects the input-output process, but also clarify the three basic flows that are contained in the process input-output.

1. In the teaching apparatus, three activities (purchase 33, production 35, sale 31) are linked together. For a direction of the information flow, sale is the upstream, because first have an order, then the production planning is worked out, and the material purchase planning is finally worked out. However, as far as a direction of material flow is concerned, the material purchase is first completed, then the production is performed; the sale products are finally carried out after the products are manufactured. Therefore, three activities (including purchasing, production, sale) are linked together, and it is the business process input and output of the first process, we define it as the main process. The level of the main process is the most direct cause that effects the input-output processes. The students can be told that if the input and output is controlled, the main process must be first controlled.

2. In the teaching apparatus, the teaching apparatus also shows three activities including the human resource 34, the finance 32, and the product development 35. The three activities mainly provide services to the main flow such as human resource, finance, technical services. The three activities are defined as the auxiliary flow. The level of the auxiliary flow will effect the level of the main flow. The main flow and auxiliary flow include six activities (purchase, production, sale, human resource, finance, R&D), and the six activities just are the production and operation activities.

3. In the teaching apparatus, the teaching apparatus shows four activities including the enterprise information 60, strategy 50, plan 40, and management 20. The four activities form the guidance and control flow for the enterprise input-output process. The function of the guidance and control process includes: it is necessary to guide the development direction of the production and operation by the information, strategy, plans activities; management activity controls the production and operation activities. The students can understand to grab the guidance and control flow to improve the production and operation levels.

Third, the students are able to understand the operation technique of controlling the enterprise input-output process by use of the teaching apparatus.

In the past knowledge system, enterprise leaders can not find the operation steps for controlling the input and output process, can not find the work entry point and the reliable control technology. The teaching apparatus of the invention can solve the above three issues. The steps are described as follows:

1. In the teaching apparatus, the reverse quadrangle cone 60 defining the information processing module 60 obtain the external market information by four ribbons 63 defining the external market information feedback system and the internal information by the core solid column 80 defining the internal information system. And then all the information should be dealt with to obtain two types of information such as the performance information of the internal production and operation (six activities) to evaluate the performance of these departments, and the future forecast information for predicting the future enterprise situation. The performance information is the instant information for providing the basis for the performance assessment and salary payment of the enterprise. The future forecast information is used for enterprise leaders to provide the basis for the development strategy of the enterprise.

2. Then, the information processing system transfers the processed forecast information to the second block body 50 defining the strategy module (the strategy decision-maker such as the board of directors), the strategy module constitutes or adjusts the enterprise development strategy based on the predicting information provided by the information processing module 60.

3. Subsequently, the second block body 50 defining the strategy module provides the version of the strategy to the vertical column 40 defining the planning system module (such as all the managers), and the managers make the middle-long term development plans, the annual plans and monthly plans based on the enterprise development strategy.

4. Subsequently, the vertical column 40 defining the planning system module transfers the monthly plan to the production and operation departments and order the production and operation departments to complete the monthly plan on time. At the same time, the vertical column 40 defining the planning system module provides the plan to the management department (the first block body 20 defining management module), and authorize the management departments to assess the performance of the production and operation departments 31-35 based on the plan.

5. Finally, the management department 20 examines the work performance of each production and operation department based on elements of the production and operation plan, and according to examination results, pays the remuneration for the production and operation department to improve the executive ability of the production and operation departments for completing the plan, thereby ensuring the production and operation process (the input-output process) controlled by the enterprise development strategy and production and operation plans. The students can improve the operation ability for controlling the enterprise input-output process by use of the teaching apparatus.

I claim:

1. A teaching apparatus for enterprise input-output, comprising:
   a base, said base defining a market system;
   a first block body defining a management module, and the first block body including four overlapping cuboids, where the four cuboids of the first block body become smaller from a bottom to a top of the first block body in a center of the base;
   a plurality of bands defining a production system and a product development system module, and a business system module, each band being sandwiched between two adjacent cuboids of the first block body;
   a vertical column defining a planning system module, the vertical column being disposed on the first block body and the bands;
   a second block body defining a strategy module, the second block body including four overlapping cuboids which become larger from a bottom to a top of the second block body, wherein the second block body is disposed on a top end of the vertical column and is positioned in an opposite direction with respect to the first block body;
   a reverse quadrangle cone defining an information processing module, the reverse quadrangle cone being displaced on a center of a top of the second block body;
   four ribbons defining an enterprise outer market information feedback system, the four ribbons respectively connecting the reverse quadrangle cone with the base;
   a cuboid vertical column disposed at a top of the reverse quadrangle cone, the cuboid vertical column defining an information assessing and information disclosure system; and
   a core solid column defining an internal information system, one end of the core solid column being disposed on the base, another end of the core solid column being disposed on the cuboid vertical column, and the core solid column penetrating through a center of the first block body, the bands, the vertical column, the second block body, the reverse quadrangle cone, and the cuboid vertical column.

2. The teaching apparatus for enterprise input-output of claim 1, wherein a concave is defined in the center of the base, four ring steps being formed on an inside wall of the concave.

3. The teaching apparatus for enterprise input-output of claim 2, wherein the base is divided into four equal areas, respectively defining a product sale module, a capital operation module, a material and technology purchase module, and a human resource module, the product sale module including four ring steps defining a low-value sale level, a market value sale level, a high-value sale level and an ultra-value sale level from a bottom to a top of the concave; the capital operation module including four ring steps defining a capital reduction level, a capital market value level, a capital high value level and a capital ultra-value level; the material and technology purchase module including four ring steps defining a high-price purchase level, a market value purchase level, a low-price purchase level and a personalized purchase level; the human resource module including four ring steps defining a high-price employment level, a market price employment level, an economic employment level and an ultra-value level; a vertical height of each step of the capital operation module, the material and technology purchase module, the human resource module from the bottom to the top of the concave representing a price level obstacle, a relation level obstacle, a brand level obstacle and an information level obstacle, a vertical height of each step of the product sale module representing a price level obstacle, an information level obstacle, a brand obstacle and a relation level obstacle from the bottom to the top of the concave, the area defining the product sale module being symmetric to the area defining the material and technology purchase module, the area defining the capital operation module being symmetric to the area defining the human resource module.

4. The teaching apparatus for enterprise input-output of claim 3, wherein each of the first block body, the ring steps and the bands comprises at least four levels, the number of bands is eight and the bands being configured to form a cross shape, one end of each band connected to a corresponding ring step.

5. The teaching apparatus for enterprise input-output of claim 4, wherein the four overlapping cuboids of the first block body respectively representing an invalid management module, a valid management module, a high-efficiency management module and an innovative management module from the bottom to the top of the first block body; the bands comprising an invalid level, a valid level, a high-efficiency level and an innovative level from a bottom to a top of the bands corresponding to each module of the first block body.

6. The teaching apparatus for enterprise input-output of claim 5, wherein one end of the bands respectively connects with the product sale module, the capital operation module, the material and technology purchase module and the human resource module to thereby respectively defining the eight bands as a marketing system module, a financial system module, a purchase system module, and a human resource system module, a crossing center of the bands forming the production system and product development system module.

7. The teaching apparatus for enterprise input-output of claim 6, wherein the vertical column is divided into three sections from a bottom to a top of the vertical column, representing a middle and long term plan, an annual plan and a monthly plan, respectively, four sides of the vertical column representing a market marketing plan corresponding to the product sale module, a capital operation plan corresponding to the capital operation module, a material and technology purchase plan corresponding to the material and technology purchase module, and a human resource plan corresponding to the human resource module.

8. The teaching apparatus for enterprise input-output of claim 3, wherein the four overlapping cuboids of the second block body respectively representing a non-information strategy module, a semi-information strategy module, a current information strategy module and a full information strategy module from the bottom to the top of the second block body; the top surface of the second block body representing said strategy module, the strategy module comprising a core strategy, an edge strategy, a profiting mode strategy, a management elevation strategy, a product development strategy, a market area strategy and an enterprise scale strategy; the edge strategy comprising a market sale strategy, a capital operation strategy, a material and technology purchase strategy and a human resource strategy, which are located around the core strategy, wherein said market sale strategy corresponds to the product sale module on the top and bottom of same side, the capital operation strategy corresponds to the capital operation module on the top and bottom of same side, the material and technology purchase strategy corresponds to the material and technology purchase module on the top and bottom of same side, the human resource strategy corresponds to the human resource module on the top and bottom of same side.

9. The teaching apparatus for enterprise input-output of claim 2, wherein four sides of the reverse quadrangle cone respectively represents a sale information processing, a fund information processing, a material and technology processing and a talent information processing of the market system; four ribbons respectively connecting the reverse quadrangle cone with the base representing that the information directly get market information from the market system, a top surface of the reverse quadrangle cone representing an information center, four ribbons respectively connecting the reverse quadrangle cone with the cuboid vertical column representing that an inner information of the enterprise directly transmits to the information center, the four sides of the cuboid vertical column respectively represents the enterprise's product competition, capital competition, material and technology purchase competition and human competition, the peak of the cuboid vertical column represents the enterprise's core competition.

10. The teaching apparatus for enterprise input-output of claim 1, wherein the teaching apparatus for enterprise input-output shows an approximate pyramid shape on the whole, along the direction form a bottom to a top of the teaching apparatus, each cuboid of the first block body is overlapped to form a pyramid in shape, each cuboid of the second block body is overlapped to form a reverse pyramid in shape; each cuboid of the first block body and the second block body is a quadrangle or cylinder shaped desk, the vertical column is rectangular in shape, and the core solid column is a cylinder in shape.

* * * * *